United States Patent [19]

Yamazaki et al.

[11] Patent Number: 4,579,464
[45] Date of Patent: Apr. 1, 1986

[54] ELECTRONIC CLINICAL THERMOMETER

[75] Inventors: Yasuo Yamazaki; Yutaka Muramoto, both of Fujinomiya, Japan

[73] Assignee: Terumo Kabushiki Kaisha, Tokyo, Japan

[21] Appl. No.: 601,378

[22] Filed: Apr. 17, 1984

[30] Foreign Application Priority Data

Aug. 9, 1983 [JP] Japan ................. 58-144487

[51] Int. Cl.⁴ .................. G01K 1/00; G01K 7/00
[52] U.S. Cl. .................... 374/163; 374/183; 374/208; 374/170; 340/384 E
[58] Field of Search ............. 374/170, 183, 188, 208, 374/163; 340/384 E, 546, 586

[56] References Cited

U.S. PATENT DOCUMENTS

| 3,651,694 | 3/1972 | Lamb | 374/170 |
|---|---|---|---|
| 3,733,804 | 5/1973 | Diersbock | 340/384 E |
| 3,879,726 | 4/1975 | Sweany | 340/384 E |
| 4,197,741 | 4/1980 | Morrow, Jr. | 374/170 |
| 4,306,229 | 12/1981 | Tamura et al. | 340/629 |
| 4,444,517 | 4/1984 | Murase | 374/188 |

FOREIGN PATENT DOCUMENTS

| 2754090 | 6/1979 | Fed. Rep. of Germany . |
|---|---|---|
| 2025093 | 1/1980 | United Kingdom . |
| 1575426 | 9/1980 | United Kingdom . |
| 2113397A | 8/1983 | United Kingdom ........... 374/170 |

Primary Examiner—Charles Frankfort
Assistant Examiner—Thomas B. Will
Attorney, Agent, or Firm—Frishauf, Holtz, Goodman & Woodward

[57] ABSTRACT

An envelope of an electronic clinical thermometer has an inner wall on which is mounted a vibrating element adapted to produce an audible tone. The portion of the envelope at which the vibrating element is provided is formed to include a portion that vibrates together with the vibrating element, when the latter is set into operation. The mounting arrangement for the vibrating element is defined in part by a recess formed in the inner wall of the envelope.

4 Claims, 4 Drawing Figures

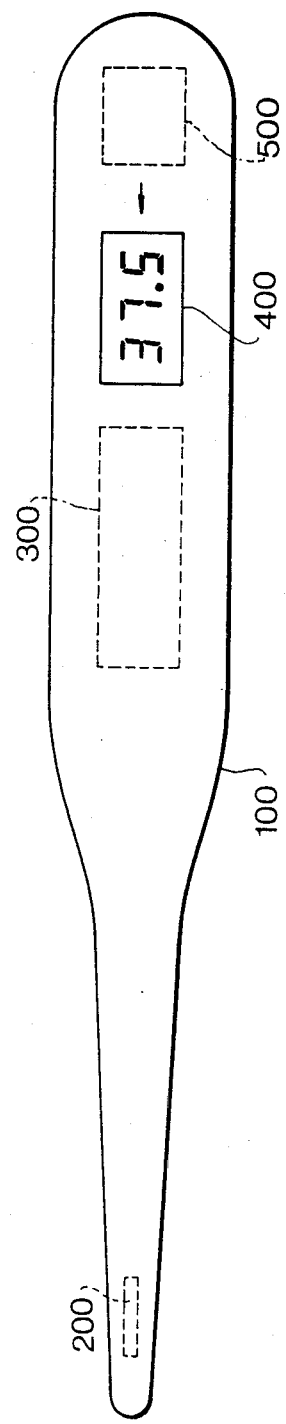
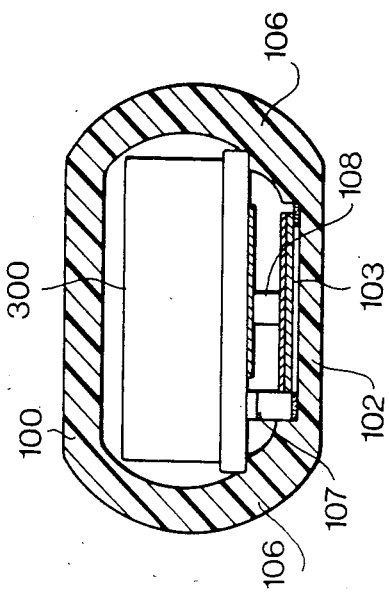
FIG. 1
FIG. 2

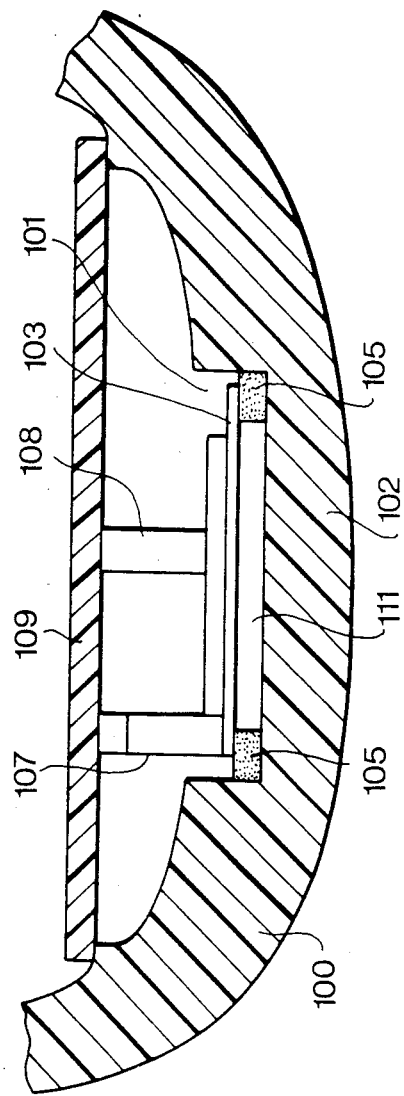
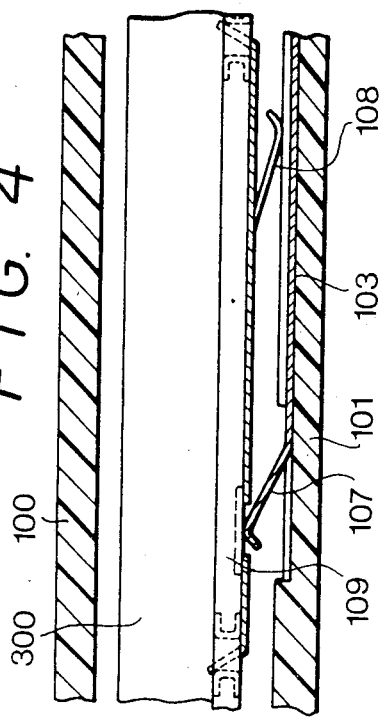

4,579,464

ELECTRONIC CLINICAL THERMOMETER

BACKGROUND OF THE INVENTION

1. Field of the Invention

This invention relates to an electronic clinical thermometer, particularly an electronic clinical thermometer of the type having a hermetically sealed envelope the interior of which accommodates an alarm tone generating unit.

2. Description of the Prior Art

Various improvements made possible by advances in electronic techniques have been proposed for electronic clinical thermometers in recent years. Among them is an alarm which, when activated, informs one that a temperature measurement has ended or that a measurement error has occurred. However, an integrated electronic clinical thermometer incorporating both a temperature sensing unit and the alarm in one body has not yet been put into practical use.

While no particular difficulty is involved in providing the conventional electronic clinical thermometer with an acoustic generator, a problem of maintaining liquid-tightness is encountered. Specifically, unless the thermometer envelope is equipped with holes through which sound may pass, an alarm tone of satisfactory volume cannot be obtained, particularly with a small-size clinical thermometer when inserted into an armpit to sense body temperature. The holes make it impossible to achieve a liquid-tight structure. Another drawback involves cleaning and prevention of infection, for it is known that a surface having holes or recesses does not readily lend itself to the thorough washing and sterilization that electronic clinical thermometers require. For these reasons, a practical electronic clinical thermometer having a built-in alarm has not been realized.

SUMMARY OF THE INVENTION

An object of the present invention is to provide an electronic clinical thermometer devoid of the aforementioned shortcomings encountered in the prior art.

Another object of the present invention is to provide an electronic clinical thermometer capable of generating an alarm tone in an efficient manner.

Still another object of the present invention is to provide an electronic clinical thermometer which is made liquid-tight and thoroughly washable and sterilizable by adopting an integrated structure in which the thermometer envelope is devoid of holes for emission of sound.

A further object of the present invention is to provide an electronic clinical thermometer capable of being reduced in thickness.

According to the present invention, the foregoing objects are attained by providing an electronic clinical thermometer comprising an envelope having a hollow interior for accommodating the circuit components of the thermometer, vibrating means for producing an audible tone, and mounting means formed on a portion of an inner wall defining the hollow interior of the envelope for mounting the vibrating means, the portion of the inner wall being formed to include a vibrating part for vibrating together with the vibrating means.

In a preferred embodiment of the invention, the mounting means is a recess provided at the abovementioned portion of the inner wall, and the vibrating element comprises a piezoelectric vibrating element. The hollow interior of the envelope is sealed liquid-tightly.

Other features and advantages of the pesent invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating the overall construction of an embodiment of an electronic clinical thermometer according to the present invention, and FIGS. 2 through 4 are views useful in describing principal components of the electronic clinical thermometer of the present invention, in which:

FIG. 2 is an enlarged cross-sectional view perpendicularly intersecting the axis of the thermometer to illustrate a portion mounting a vibrating element;

FIG. 3 is a view showing an enlarged portion of FIG. 2 to illustrate in detail the manner in which the vibrating element is mounted; and FIG. 4 is an enlarged partial cross-sectional view taken axially of the electronic clinical thermometer and is useful in describing the manner in which the vibrating element is mounted.

DESCRIPTION OF THE PREFERRED EMBODIMENT

With reference to the block diagram of FIG. 1 showing the overall construction of an embodiment of an electronic clinical thermometer according to the present invention, the thermometer includes an envelope 100 for internally accommodating the electronic components and circuitry that constitute the thermometer. Disposed within the envelope 100 at the tip thereof is a temperature sensing element 200 for producing an electric signal corresponding to the sensed temperature of a body undergoing measurement, and for delivering the signal to electronic clinical thermometer circuitry 300 which includes a vibrating element drive circuit, and which is adapted to process the signal from the sensing element 200 to provide a signal indicative of temperature. The temperature sensing element 200 and electronic clinical thermometer circuitry 300 employ well-known circuitry disclosed in the specification of British Patent Application Laid-Open No. 2113397 laid open on Aug. 3, 1983. A display unit 400 displays the temperature signal obtained from the thermometer circuitry 300. A power supply unit 500 supplies power to each of the loads constituting the thermometer.

FIGS. 2 through 4 are sectional views showing the principal electronic components and are useful in describing the present invention. Provided below the electronic clinical thermometer circuitry 300 including the vibrating element drive circuit is a vibrator mounting section 101 on which there is mounted a vibrating element 103 such as a piezoelectric buzzer. The mounting section 101 includes a vibrating portion which vibrates together with the piezoelectric buzzer 103, and is formed by a recess provided in a flat inner wall of the envelope 100 constituting the electronic clinical thermometer, which is of the so-called "flat" type. The recess has a bottom portion 102 and side wall portions 106, 106. In a case where the side wall portions 106, 106 are to serve as nodes of vibration, the bottom portion 102 of the recess constitutes the abovementioned vibrating portion and, hence, is made thin enough to form an antinode. As shown in FIG. 3, the piezoelectric buzzer 103 constituting the vibrating element has two of its opposing side edges cemented to the thin bottom portion 102 by a bonding agent 105. Defined between the bottom side of the piezoelectric buzzer 103 and the bottom portion 102 of the envelope 100 is a cavity 111 having a width decided by the thickness of the bonding agent 105. With this construction, vibration of the piezoelectric element 103 sets the entirety of the thermometer envelope 100 into vibration, particularly the thin bottom portion 102 which is especially susceptable to vibration. The envelope 100 and bottom portion therefore emit an audible tone. A projecting electrode 107 connected to the piezoelectric element 103 and a metal leaf electrode 108 connected to a printed circuit board 109 bring the piezoelectric element 103 into electrical contact with the circuit board 109.

Thus, an output signal from the vibrating element (piezoelectric buzzer) drive circuit, which is set into operation by an output from the electronic clinical thermometer circuitry 300, is applied to the piezoelectric buzzer 103 via the circuit board 109, projecting electrode 107 and metal leaf electrode 108. In response to the output signal, the piezoelectric buzzer 103 develops strain which is transmitted to the vibratory bottom portion 102, causing the latter to vibrate and emit an audible tone. Vibration of the bottom portion 102 also causes the thermometer envelope 100 to vibrate and produce an audible tone, as set forth above.

It should be noted that an audible tone of considerable volume can be obtained as the result of resonance if the natural frequency of the vibratory bottom portion 12 is the same as that of the vibrating element 103. However, a tone of fully satisfactory volume is produced and, hence, the objects of the invention are achieved, even without equivalent natural frequencies.

Owing to the above-described construction of the electronic clinical thermometer according to the present invention, setting the piezoelectric element into vibration to produce sound causes the side wall portions 106 to act as vibratory nodes, induces vibration throughout the entirety of the thermometer envelope 100 and enhances the sound-generating effect of the vibrating portion 102. Moreover, since the section 101 mounting the vibrating element 103 is constituted by the recess provided on the inner side of the envelope, and since the recess accommodates the vibrating element, there is no obstacle to reducing the electronic clinical thermometer in size and thickness even though the vibrating element is installed within the thermometer.

All of these advantages are realized by the provision of the vibrating element mounting section 101 having the vibrating bottom portion 102, which is formed by reducing the thickness of the envelope 100, the latter being of a unitary, liquid-tight structure. Accordingly, the electronic clinical thermometer of the present invention features a perfect, liquid-tight seal, is easy to wash and sterilize and is highly durable.

As many apparently widely different embodiments of the present invention can be made without departing from the spirit and scope thereof, it is to be understood that the invention is not limited to the specific embodiments thereof except as defined in the appended claims.

What we claim is:

1. An electronic clinical thermometer, comprising:
   an integrally formed one piece envelope having a wall defining a hollow interior for accommodating circuit components for sensing, measuring and displaying temperature, said one piece envelope being sealed liquid-tightly;
   resonance means integrally formed in a portion of said wall defining said hollow interior of said envelope, said resonance means being defined by a wall section of said envelope wall which is thinner than the remainder of said envelope wall, thus forming a cavity in said envelope wall, which cavity opens to said hollow interior; and
   vibrating means which is energizable for producing an audible tone, said vibrating means being secured onto said wall section of said resonance means;
   said resonance means and said cavity formed thereby being dimensioned such that boundary portions of said wall section at its intersection with the remainder of said envelope wall define nodes of vibration, said, resonance means vibrating in resonance with said vibrating means when said vibrating means is energized to thereby produce said audible tone.

2. The electronic clinical thermometer according to claim 1, wherein said vibrating means comprises a piezoelectric vibrating element.

3. The electronic clinical thermometer according to claim 1, wherein said vibrating means is mounted in said cavity.

4. The electronic clinical thermometer according to claim 3, wherein only peripheral portions of said vibrating means are secured onto said boundary portions of said cavity.

* * * * *